（12) United States Patent
Vallino

(10) Patent No.: US 10,526,920 B2
(45) Date of Patent: Jan. 7, 2020

(54) ELECTRICAL CONNECTOR FOR TURBINE ENGINE CASING

(71) Applicant: SAFRAN AERO BOOSTERS SA, Herstal (BE)

(72) Inventor: Frédéric Vallino, Seraing (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 0 days.

(21) Appl. No.: 15/946,154

(22) Filed: Apr. 5, 2018

(65) Prior Publication Data

US 2018/0298783 A1    Oct. 18, 2018

(30) Foreign Application Priority Data

Apr. 14, 2017   (BE) .................................. 2017/5264

(51) Int. Cl.
| | |
|---|---|
| H01R 13/52 | (2006.01) |
| F01D 25/24 | (2006.01) |
| H02G 3/00 | (2006.01) |
| H01R 4/64 | (2006.01) |
| H01R 13/73 | (2006.01) |

(52) U.S. Cl.
CPC ............. F01D 25/243 (2013.01); H01R 4/64 (2013.01); H01R 13/73 (2013.01); H02G 3/00 (2013.01); *F05D 2240/14* (2013.01); *F05D 2300/603* (2013.01); *Y02T 50/672* (2013.01)

(58) Field of Classification Search
CPC ......... F01D 25/243; H01R 4/64; H01R 13/73; H02G 3/00; Y02T 50/672; F05D 2240/14; F05D 2300/603

USPC .................................. 439/926, 191, 194, 100
See application file for complete search history.

(56) References Cited

U.S. PATENT DOCUMENTS

| 3,710,568 | A | * | 1/1973 | Rice ......................... F02C 7/32 |
| | | | | 60/796 |
| 4,378,138 | A | * | 3/1983 | Sohre ..................... H01R 39/38 |
| | | | | 439/26 |
| 4,913,657 | A | * | 4/1990 | Naito ..................... F16L 11/127 |
| | | | | 439/192 |
| 2004/0266274 | A1 | * | 12/2004 | Naudet ................... F02C 7/222 |
| | | | | 439/719 |
| 2013/0189868 | A1 | * | 7/2013 | Fitt ...................... H01R 13/518 |
| | | | | 439/272 |

(Continued)

FOREIGN PATENT DOCUMENTS

| BE | 582614 A | 12/1959 |
| EP | 1156211 A2 | 11/2001 |

(Continued)

OTHER PUBLICATIONS

Search Report dated Dec. 4, 2017 for BE 201705264.

*Primary Examiner* — Abdullah A Riyami
*Assistant Examiner* — Nelson R. Burgos-Guntin
(74) *Attorney, Agent, or Firm* — James E. Walton

(57) ABSTRACT

A turbine engine casing, and in particular an axial turbine engine compressor casing, includes an annular wall and a fastening flange associated with the wall. The fastening flange includes a fastening surface applied against a corresponding mounting surface of the turbine engine, for example, a surface on an intermediate fan casing or a mounting surface of a flow separator. The fastening flange includes at least one electrical connector with one end lying flush with the fastening surface of said fastening flange.

15 Claims, 4 Drawing Sheets

(56) References Cited

U.S. PATENT DOCUMENTS

2014/0325994 A1* 11/2014 Dowdell ............... H01R 12/77
                                                                              60/801

FOREIGN PATENT DOCUMENTS

| EP | 1811132 A1 | 7/2007 |
|----|------------|--------|
| FR | 1071709 A  | 9/1954 |

* cited by examiner

ELECTRICAL CONNECTOR FOR TURBINE ENGINE CASING

This application claims priority under 35 U.S.C. § 119 to Belgium Patent Application No. 2017/5264, filed 14 Apr. 2017, titled "Electrical Connector for Turbine Engine Casing," which is incorporated herein by reference for all purposes.

BACKGROUND

1. Field of the Application

The present application relates to the field of electrical connections on turbine engine casings. The present application also concerns an axial turbine engine, notably an airplane turbojet or an aircraft turboprop.

2. Description of Related Art

The aeronautical industry aims to develop an all-electric aircraft. In this context, a number of devices use an electrical power supply. These various devices are mounted on the various support casings of the turbine engine, and require special connections that do not impede the mounting of the various supporting casings in any way. This mounting becomes complicated because of the weight, bulk, compactness, lack of visibility and small number of handling points of the casings.

The document EP 1 811 132 A1 discloses a turbine engine comprising an electric generator/starter whose rotor is driven by the shaft of a high-pressure compressor and whose stator is carried by an intermediate casing of the turbine engine, the generator/starter being enclosed in a sealed housing mounted in an enclosure upstream of the turbine engine which is located inside the intermediate casing and contains oil, the sealed housing of the generator/starter being supplied with pressurized air. The sealed housing comprises first means of connection to electrical cables mounted in structural arms of the intermediate casing, these first connection means being sealed and extending inside a chamber delimited by the housing and by the intermediate casing and supplied with pressurized air. The connection means have, in particular, pins protruding from an annular wall, for insertion into conductive tubes during connection. Connection requires accurate alignment of the pins, which might otherwise become twisted when inserted.

Although great strides have been made in the area of electrical connectors for turbine engine casing, many shortcomings remain.

DETAILED DESCRIPTION OF THE PREFERRED EMBODIMENT

Figure 1:
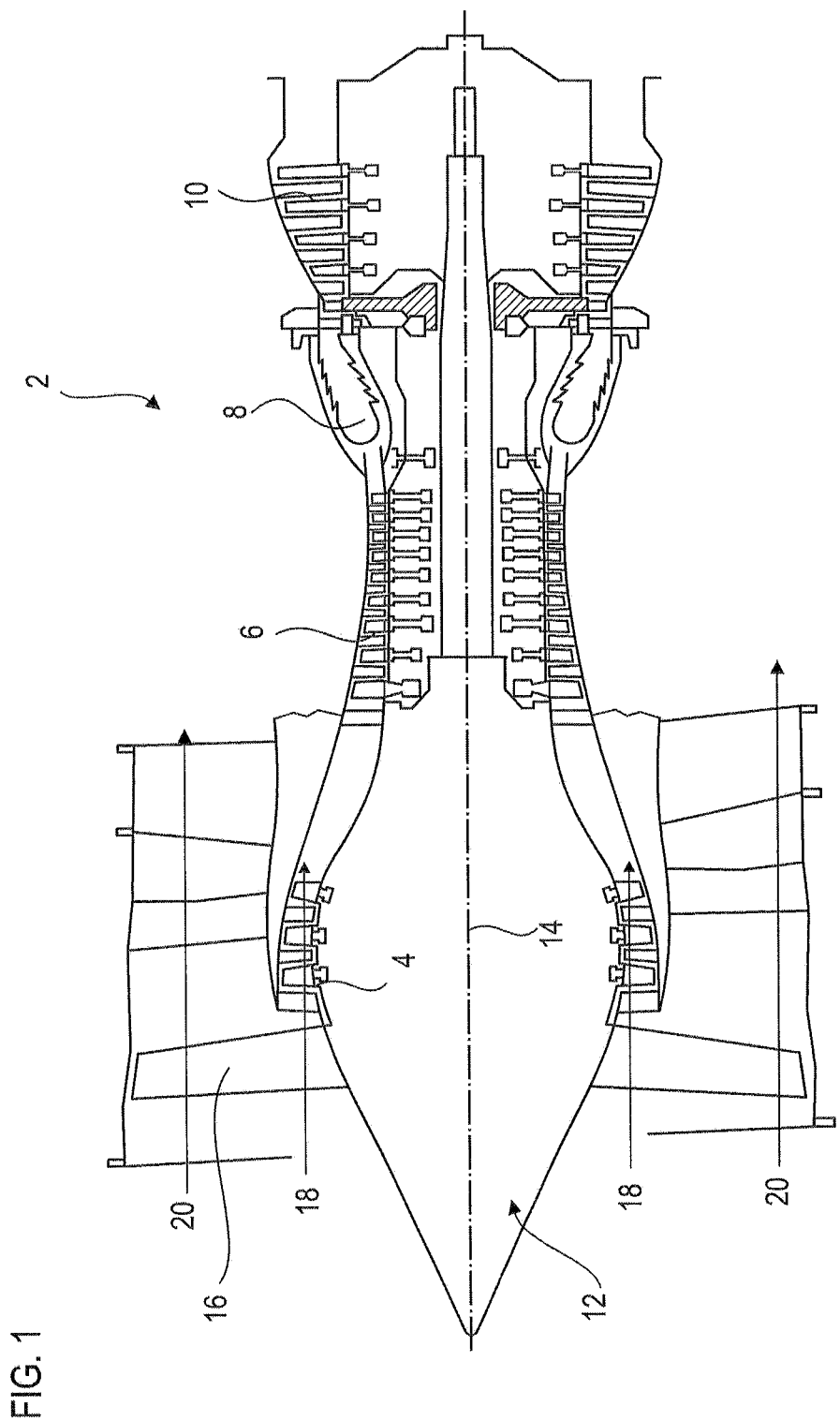
FIG. 1 shows an axial turbine engine according to the present application.

The present application aims to solve at least one of the problems posed by the prior art. More precisely, the present application proposes to facilitate the mounting of a turbine engine casing comprising an electrical connector. Another object of the present application is to propose a solution which is strong, reliable, easily produced, convenient to maintain and easy to inspect, and which optimizes blind mounting.

The present application proposes a turbine engine casing, notably for an axial turbine engine compressor, the casing comprising a wall and at least one fastening flange associated with the wall, the fastening flange comprising a fastening surface that can be applied against a corresponding mounting surface of the turbine engine, or against another fastening surface, the carter being remarkable in that the fastening flange comprises at least one electrical connector with one end lying flush with the fastening surface of said fastening flange.

According to advantageous embodiments of the present application, the casing may comprise one or more of the following characteristics, considered in isolation or in all technically feasible combinations:

The electrical connector comprises an end surface which lies flush with the surface of the fastening flange, and/or which is at the position of the fastening surface.

The flange has a thickness, the connector passing through the thickness of said flange.

The casing, notably the fastening flange, comprises indexing means for providing a positioning accuracy which is greater than or equal to the width of the electrical connector at the position of the fastening surface.

The fastening surface forms a perpendicular plane or a plane including the axis of rotation of the turbine engine.

The electrical connector is in the general shape of a rod with its main elongation in the direction of the thickness of the fastening flange.

The electrical connector comprises an enlargement at one of its ends at least, or at both of its ends opposed in the direction of the main elongation of said electrical connector.

The electrical connector is positioned in the height, notably the radial height, of the flange.

The fastening flange comprises fastening means, notably fastening apertures and/or pins, the electrical connector being at the radial height of said fastening means.

The fastening flange further comprises a housing positioned in its radial height, the connector being placed in said housing.

The fastening flange comprises an electrical insulator surrounding the electrical connector and separating the connector from the fastening flange, the electrical insulator forms a seal, if required, between the fastening flange and the electrical connector.

The connector is connected to an electrical cable, said cable passing through the fastening flange if required.

The casing is formed by a composite material with an organic matrix and reinforcing fibres which may be electrically conductive if required.

The wall forms a circle or a semicircle, and/or the fastening flange is a curved flange or an axial flange.

The wall has a thickness, the fastening flange forming a rim of increased thickness relative to the thickness of the wall, and/or the fastening flange extends perpendicularly relative to the wall.

The wall is a first wall, the casing further comprising a second wall with a fastening flange and electrical connector identical or similar to those associated with the first wall, the fastening flanges being fastened together so as to provide an electrical contact between the connectors.

The casing further comprises a third wall with a fastening flange and electrical connector identical or similar to those associated with the first wall, the fastening surface of the flange of the third wall being a first fastening surface, said flange comprising a second fastening surface opposed to the first fastening surface in the direction of the thickness of said flange, the electrical connector of the third wall lying flush with each of the fastening surfaces of the third wall, said third wall being in contact with the fastening surfaces of the first and second wall if required.

The flange has an outside radius, the connector being positioned inside said outside radius.

The end surface and/or the cross section of the connector at the position of the fastening surface has a surface area greater than or equal to 0.50 mm$^2$, or 1.00 mm$^2$, or 3.00 mm$^2$, or 10 mm$^2$.

The wall comprises two half-shells.

The wall is generally tubular or ellipsoidal.

The fastening surface is at least partially formed by the electrical insulator.

At least one, or each, electrical connector is made in one piece.

The fastening surface is generally flat, and extends over the whole of a face and/or the whole of an edge of the wall.

The electrical insulator fills the housing of the flange.

The casing is an annular casing, the flanges being annular flanges.

The cable follows the outer surface of the outer casing wall.

The electrical connectors are aligned, and/or one connector is in the extension of another, or a number of connectors are in the extensions of one another.

The electrical connector is a first electrical connector, the casing comprises a second electrical connector lying flush with the mounting surface and placed in correspondence with the first connector so as to provide an electrical contact between said connectors.

The fastening flange comprises a surface opposed to the fastening surface in the direction of the thickness of said fastening flange, the electrical connector projecting from said opposed surface.

The housing further comprises an electrical insulator, positioned between the connector and the flange.

The connectors are parallel, being, notably, parallel rods.

The flange comprises a plurality of electrical connectors, arranged circularly and/or in a grid pattern if required.

The present application also relates to a casing for a compressor of an axial turbine engine, the casing comprising: a wall, and at least one fastening flange associated with the wall, the fastening flange comprising a fastening surface that can be applied against a corresponding mounting surface of the turbine engine, or against another fastening surface, wherein the fastening flange comprises at least one electrical connector with one end lying flush with the fastening surface of said fastening flange, and wherein the electrical connector comprises an end surface which lies flush and is coplanar with the fastening surface of the fastening flange.

The present application also relates to a casing for a compressor of an axial turbine engine, the casing comprising: a wall, and at least one fastening flange associated with the wall, the fastening flange comprising a fastening surface that can be applied against a corresponding mounting surface of the turbine engine, or against another fastening surface, wherein the fastening flange comprises at least one electrical connector with one end lying flush with the fastening surface of said fastening flange and wherein the wall is a first wall, the casing further comprising a second wall with a fastening flange and electrical connector identical or similar to those associated with the first wall, the fastening flanges being fastened together so as to provide an electrical contact between the connectors.

The present application also relates to a casing for a compressor of an axial turbine engine, the casing comprising: a wall, and at least one fastening flange associated with the wall, the fastening flange comprising a fastening surface that can be applied against a corresponding mounting surface of the turbine engine, or against another fastening surface, wherein the fastening flange comprises at least one electrical connector with one end lying flush with the fastening surface of said fastening flange, wherein the electrical connector comprises an enlargement at one of its ends at least, or at both of its ends opposed in the direction of the main elongation of said electrical connector.

The present application also proposes a turbine engine, notably a turbojet, comprising at least one casing, remarkable in that the casing is in accordance with the present application, and the turbine engine comprises a compressor, the casing being a casing of said compressor.

According to advantageous embodiments of the present application, the turbine engine may comprise one or more of the following characteristics, considered in isolation or in all technically feasible combinations:

The turbine engine comprises a flow separator with an electric deicing module electrically connected to the electrical connector.

The turbine engine comprises a fan and a fan support casing on which the mounting surface is formed, the mounting surface comprising an connection lying flush with the mounting surface and in electrical contact with the electrical connector, or with at least one electrical connector.

The flange is a flange delimiting a deicing system.

The turbine engine comprises corresponding indexing means.

The turbine engine comprises a rotor, the casing surrounding said rotor.

Each characteristic mentioned in relation to a wall, a flange, a connector, and a fastening surface may be applied to any wall, flange, connector, or fastening surface of the casing. In a general manner, the advantageous embodiments of each object of the present application are equally applicable to the other objects of the present application. Each object of the present application may be combined with the other objects, and the objects of the present application may also be combined with the embodiments of the description, which may also be combined with one another, in all technically possible combinations.

The present application allows secure connection during the assembly of the casing, or during the mounting of different parts on the same casing. The approach and adjustment movements of the fastening flange do not represent any risk for the connector, since the latter faces a plane formed by the mounting surface. The plane in question is essentially free of projecting parts that have a damaging effect in the field of connections. The approach movement may advantageously take place in a direction perpendicular to the fastening surface.

In the following description, the terms "internal" and "external" refer to positioning relative to the axis of rotation of an axial turbine engine. The axial direction corresponds to the direction along the axis of rotation of the turbine engine. The radial direction is a direction perpendicular to the axis of rotation. The terms "upstream" and "downstream" refer to the main direction of the flow in the turbine engine.

FIG. 1 shows, in a simplified manner, an axial turbine engine. In this particular case, the engine is a double-flow turbojet. The turbojet 2 comprises a first compression stage called the low-pressure compressor 4, a second compression stage called the high-pressure compressor 6, a combustion chamber 8 and one or more turbine stages 10. In operation, the mechanical power of the turbine 10 transmitted via the central shaft to the rotor 12 causes the two compressors 4 and 6 to move. These compressors have a plurality of rows of rotor blades associated with rows of stator blades. The rotation of the rotor about its axis of rotation 14 can thus generate an air flow and progressively compress this air flow up to the intake of the combustion chamber 8.

An intake fan, commonly referred to as a fan or blower 16, is coupled to the rotor 12 and generates an air flow divided into a primary flow 18, which passes through the aforementioned different stages of the turbine engine, and a secondary flow 20, which passes through an annular duct (shown in part) along the machine and then rejoins the primary flow leaving the turbine.

The secondary flow can be accelerated so as to generate a thrust reaction. The primary flow 18 and the secondary flow 20 are annular flows, one being located inside the other. They are channeled by the casing of the turbine engine and/or by shrouds. For this purpose, the casing has cylindrical walls or shrouds which may be internal and external.

Figure 2:
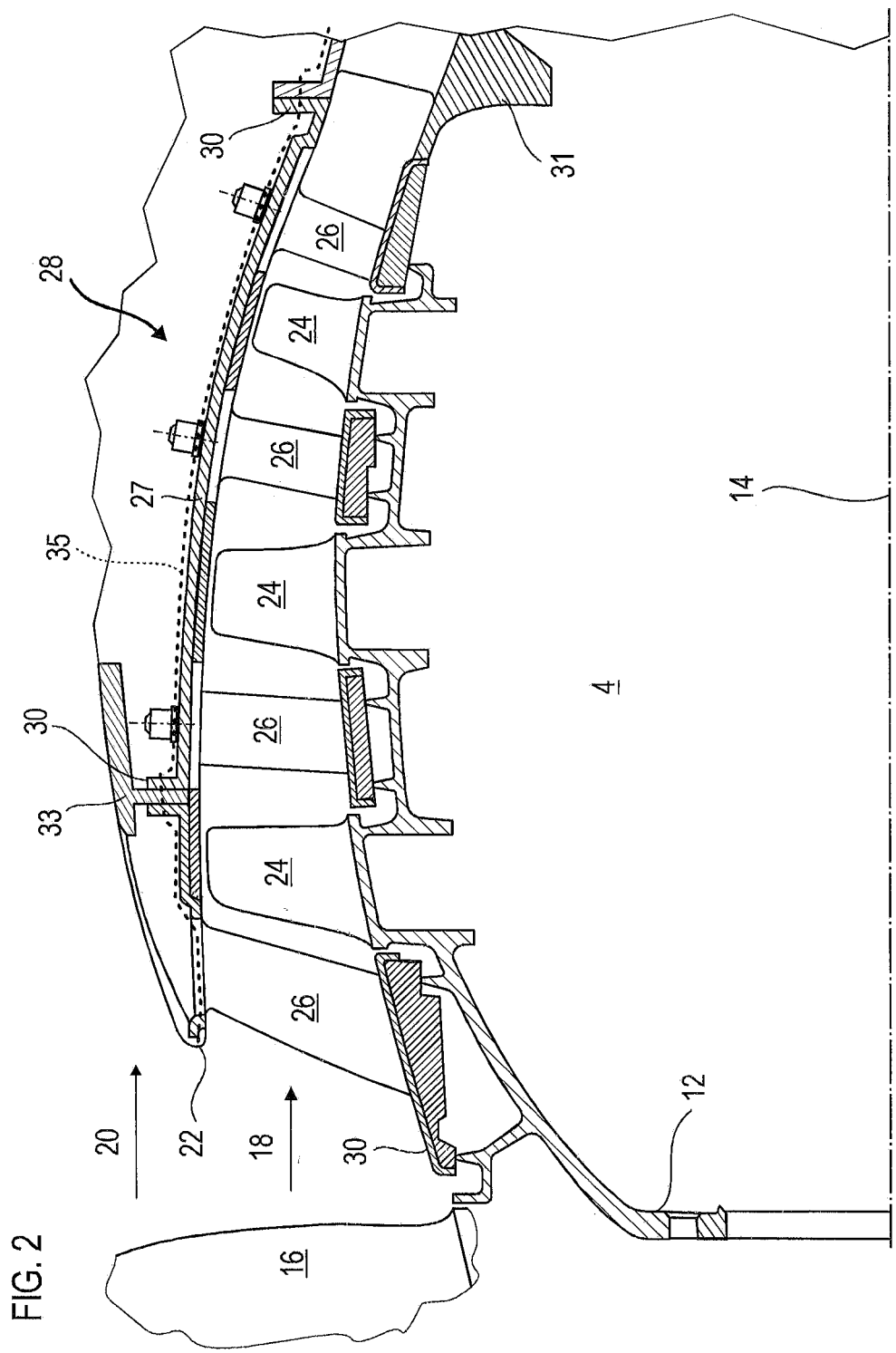
FIG. 2 is a diagram of a turbine engine compressor according to the present application.

FIG. 2 is a sectional view of a compressor of an axial turbine engine such as that of FIG. 1. The compressor may be a low-pressure compressor 4. A part of the fan 16 is shown here, together with the flow separator 22 for separating the primary flow 18 from the secondary flow 20. The rotor 12 comprises a plurality of rows of rotor blades 24, numbering three in the present case. It may be a one-piece bladed drum, or may comprise blades with dovetail fastening.

The low-pressure compressor 4 comprises a plurality of rectifiers, numbering four in the present case, each of which contains a row of stator blades 26. The rectifiers are associated with the fan 16 or with a row of rotor blades to rectify the air flow, so as to convert the speed of the flow into pressure.

The stator blades 26 extend essentially radially from an external casing 28, and may be fastened and secured there by means of pins.

If required, the stator blades of one or more annular rows may be variable-orientation blades, also called variable pitch blades. The casing 28 may be formed by a plurality of rings, or half-shells. These half-shells may be joined by fastening flanges 30 which extend radially, for example towards the outside.

The flanges 30 may be connected by an annular wall 27 which supports the stator blades 26. The flanges 30 extend perpendicularly to the wall 27. The wall 27 and/or the flanges 30 may be made of composite material, having an organic matrix for example. The matrix may be reinforced with fibres, which, if required, are arranged in threads, and/or in fibre plies, and/or in woven preforms. It should be borne in mind that these arrangements of fibres may conduct electricity, notably in the case of carbon and/or graphite fibres.

The casing 28, notably its annular flanges and its wall, surround the axis of rotation 14, and therefore the rotor 12.

A downstream flange 30 may be connected to the intermediate casing 31, which supports the fan 16. The intermediate casing 31, also called the fan support casing 31, may have a mounting surface which receives the compressor 4 via said flange 30.

An upstream flange 30 is used to mount the flow separator 22. The latter may have a fastening flange or mounting flange which is connected to the upstream flange 30 of the casing 28. Additionally, a third flange may be connected to the upstream flange, and may be used, for example, for fastening an acoustic panel 33. Thus at least three flanges, for example annular flanges, may be fastened to one another and/or stacked.

The turbine engine includes an electrical link 35 connecting an electric deicing device of the flow separator 22 to the intermediate casing 31, which itself may be connected to an electrical power supply of the turbine engine or of the aircraft. The link 35 may supply one or more actuators of variable-orientation blades. It may also be connected to sensors. The electrical link may pass axially through the wall 27, and through the fastening flanges 30, notably in the direction of their thicknesses.

Other fastening flanges, notably axial flanges, may be provided at the joint of the half-shells forming the casing 28.

Figure 3:
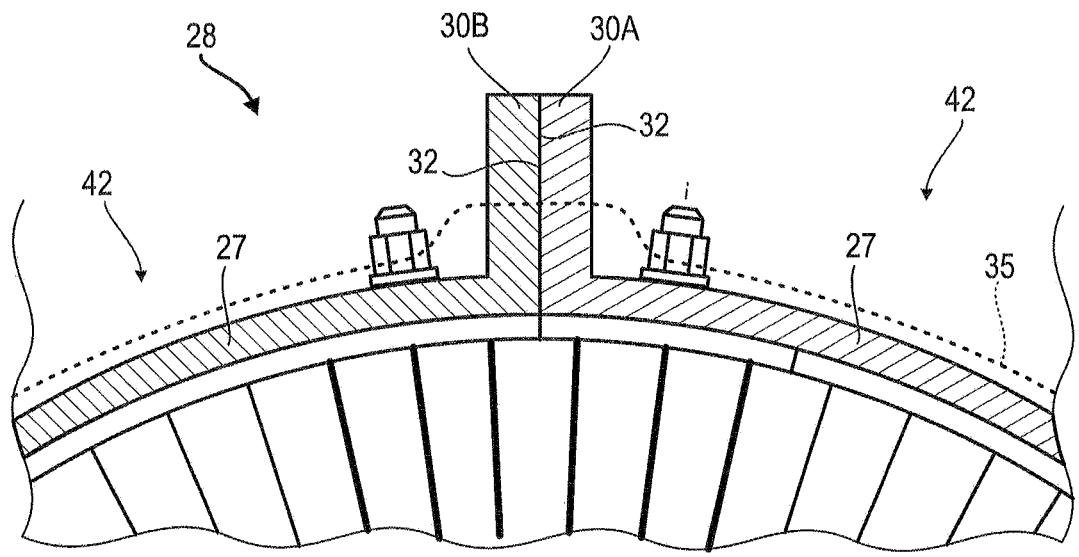
FIG. 3 is a cross section of the outer casing at the position of a fastening flange according to the present application.

FIG. 3 is a cross section of the external casing 28 at the position of an interface formed by two fastening surfaces 32 of a first fastening flange 30A and a second fastening flange 30B. This arrangement may correspond to that between the axial flanges mentioned in relation to FIG. 2. The electrical link 35 passes through the flanges (30A; 30B), notably in the circumferential direction. The wall 27 is split.

The fastening flanges (30A; 30B) are continuous with the wall 27 of the casing 28. Each half-shell 42 of the external casing 28 comprises half of the wall 27, the latter being extended radially by the fastening flanges (30A; 30B). The two fastening flanges (30A; 30B) of the adjacent half-shells of the external casing 28 meet at their fastening surfaces 32.

Figure 4:
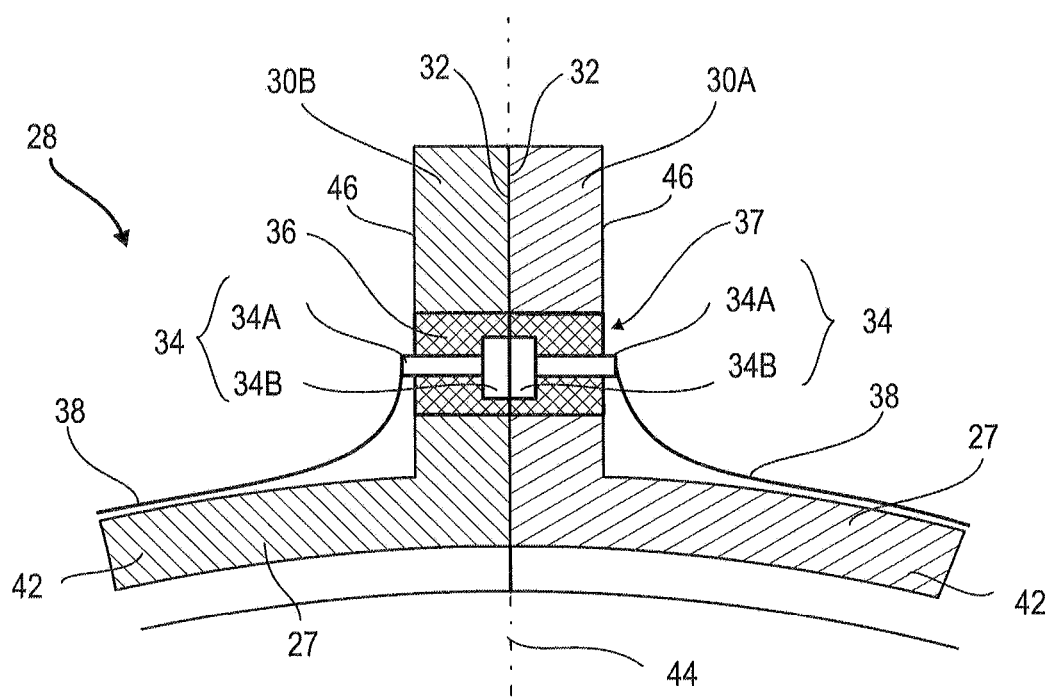
FIG. 4 is a cross section of a fastening flange comprising a connector according to the present application.

FIG. 4 shows an enlargement of the junction between the fastening flanges shown in FIG. 3.

The fastening flanges (30A; 30B) meet on a plane 44 which includes the axis of rotation of the turbine engine. At the interface between the fastening surfaces 32, notably at the position of the plane 44, the electrical junction has electrical connectors 34, extended by electrical cables 38 if required. These cables may be bonded on to the external surface of the wall 27. In this case, the connector 34 may extend mainly along the circumference.

The fastening flanges (30A; 30B) are pierced by an aperture, also called a housing 37. Each housing 37 may be filled with an electrical insulator 36 or a seal 36. Connectors 34 are located inside this insulator 36. Each connector 34 may have an enlargement 34B at the position of the fastening surface 32 of the corresponding flange. The enlargement or enlargements 34B are arranged at the end of the connector 34. Each enlargement 34B enables the electrical contact surface to be increased, and reduces the heating due to the Joule effect at the electrical interface if required.

Behind this enlargement 34B, the connector 34 has a thinner cross section 34A, or portion of reduced cross section 34A, which forms a link with the electrical cables 38, supplying the two half-shells 42 of the connector 34 with electricity. These cables 28 may be fastened to the wall 27 of the external casing 28, or integrated into the wall 27. At least one, or each, enlargement is optional. A reduced cross section 34A may come into electrical contact with another reduced cross section 34A or with an enlargement 34B.

The fastening flanges (30A; 30B) may have surfaces 46 opposed to their fastening surfaces 32. The free ends of the reduced cross sections 34A may project from the opposed surfaces 46, notably in order to be in electrical contact with the cables 38.

Each connector 34 therefore enables electrical conduction to take place between the different half-shells 42 of the casing 28, in spite of the mechanical break between the half-shells 42. Optionally, the electrical connectors have a front enlargement whose size is greater than the rear enlargement of the connector 34 positioned in the adjacent flange.

Figure 5:
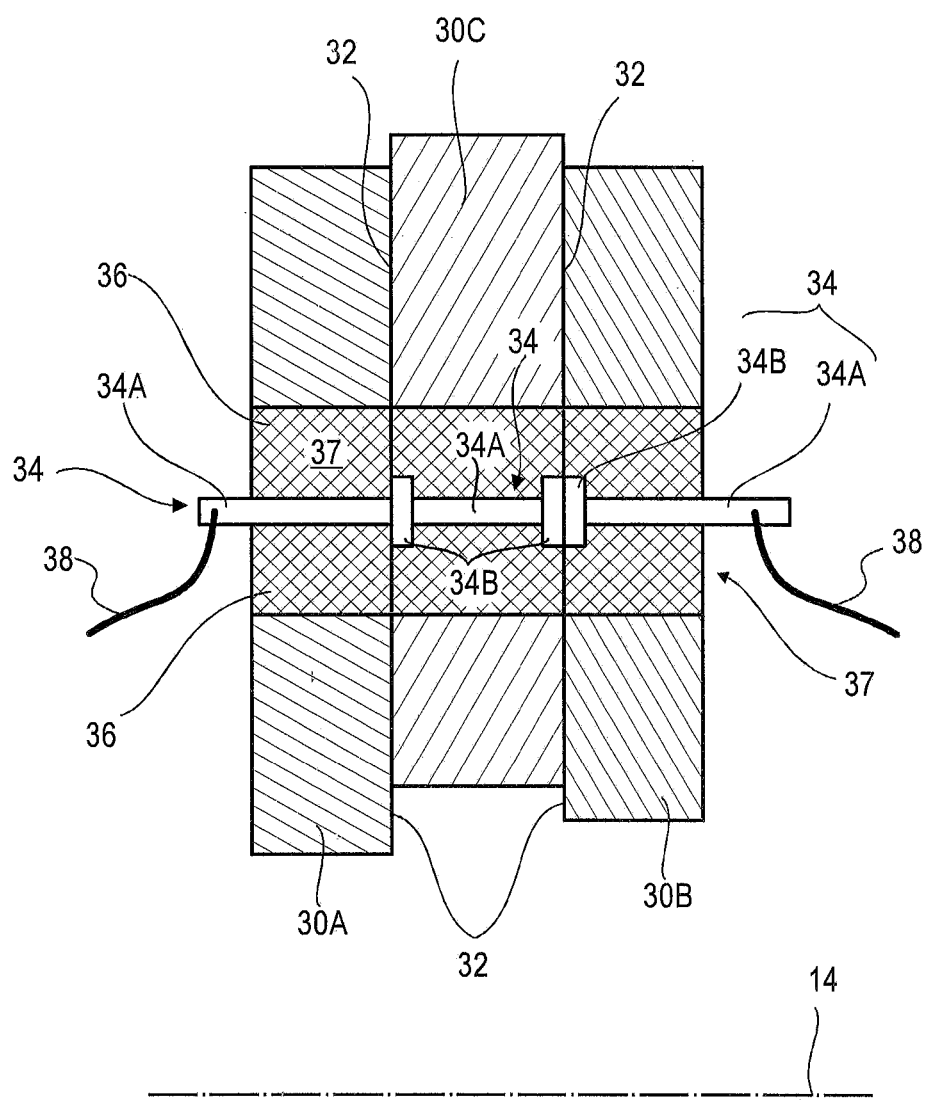
FIG. 5 is a diagram representing a series of fastening flanges comprising connectors according to the present application.

FIG. 5 is a diagram showing the set of three fastening flanges (30A; 30B; 30C) upstream of the casing as shown in FIG. 2. The axis of rotation 14 is added to provide a reference.

This arrangement of flanges resembles that of FIG. 4, but differs from it in that a third flange 30C is interleaved between the first two. Thus, three fastening flanges (30A; 30B; 30C) are pressed against one another, their fastening surfaces 32 being in contact with one another.

Each flange (30A; 30B; 30C) has a housing 37 through which a connector 34 passes. Each connector may or may not comprise an enlargement 34B at the end of its reduced cross section 34A.

The connectors 34 pass through all of these flanges 34, and allow electrical conduction from one side of the flanges to the other. The connectors 34 are in mechanical, and therefore electrical, contact. They then form an alignment. However, they allow radial and/or circumferential offsets. The connectors 34 form rods butted together. The end surfaces of the connectors allow electrical connections to be made. They are optionally substantially domed, that is to say convex.

The seals 36 fill the housings 37, and consequently the space between the electrical connectors 34 and the internal surfaces of the housings. These seals 36 may be made of a material which is not electrically conductive.

Positioning pins (not shown) may be added on the fastening flanges and/or the casings. These pins, or studs, enter holes which are adjusted to provide precise indexing of the position of the casing during its mounting. This ensures the correct positioning of the connectors relative to one another.

Additional sealing means may delimit the flanges and/or the electrical connectors 34 in order to protect the latter.

The teachings described in relation to FIG. 5 may also be applied to FIG. 4, and vice versa.

I claim:

1. Casing for a compressor of an axial turbine engine, the casing comprising:
   a wall extending annularly around an axis; and
   at least one fastening flange protruding perpendicularly from, and integral with, the wall, the fastening flange comprising:
      a fastening surface that can be applied against a corresponding mounting surface of the turbine engine, or against another fastening surface, the fastening surface being perpendicular to the axis or containing the axis; and
      at least one electrical connector with one end lying flush with the fastening surface of said fastening flange, the electrical connector comprising:
         an end surface which lies flush and is coplanar with the fastening surface of the fastening flange.

2. Casing according to claim 1, wherein the flange has a thickness, the connector passing through said flange in the direction of its thickness, the connector extending perpendicularly to the flame.

3. Casing according to claim 1, wherein the fastening flange further comprises:
   indexing elements capable of providing a positioning accuracy which is greater than or equal to the width of the electrical connector at the position of the fastening surface.

4. Casing according to claim 1, wherein the electrical connector is in the general shape of an electrically conducting rod extending perpendicularly to the flange.

5. Casing according to claim 4, wherein the electrically conducting rod comprises:
   an enlargement at one of its ends at least, or at both of its ends opposed in the direction of the main elongation of said electrical connector.

6. Casing according to claim 1, wherein the electrical connector extends perpendicularly to the axis.

7. Casing according to claim 1, wherein the fastening flange further comprises:
   fastening elements in the form of fastening apertures and/or fastening pins, the electrical connector being at the radial height of said fastening elements.

8. Casing according to claim 1, wherein the fastening flange further comprises:
   a housing positioned in its radial height, the connector being placed in said housing.

9. Casing according to claim 1, wherein the fastening flange further comprises:
   an electrical insulator surrounding the electrical connector and separating the connector from the fastening flange, the electrical insulator forming a seal between the fastening flange and the electrical connector.

10. Casing according to claim 1, wherein the connector is connected to an electrical cable, said cable extending through the fastening flange.

11. Casing according to claim 1,
   Wherein the wall and the flange are made of a composite material with an organic matrix and reinforcing fibres which are electrically conductive.

12. Casing according to claim 1, wherein the wall has a thickness, the fastening flange forming a rim of increased thickness relative to the thickness of the wall.

13. Casing for a compressor of an axial turbine engine, the casing comprising:
   a first wall extending annularly around an axis;
   a first fastening flange protruding perpendicularly from, and integral with, the first wall, the first fastening flange comprising:
      a fastening surface; and
      a first electrical connector with one end lying flush with the fastening surface of the first fastening flange; and
   a second wall with a second fastening flange, the second fastening flange protruding perpendicularly from, and integral with, the second wall, the second fastening flange comprising a fastening surface and a second electrical connector with one end lying flush with the fastening surface of the second fastening flange, the first and second fastening flanges being fastened together so as to provide an electrical contact between the first and second electrical connectors.

14. Casing according to claim 13, further comprising:
   a third wall with a third fastening flange and a third electrical connector identical or similar to the first or second electrical connectors, the third fastening flange comprising a first fastening surface:
   and a second fastening surface opposite the first fastening surface, the third electrical connector of the third wall lying flush with each of the first and second fastening surfaces of the third wall, said first and second fastening surfaces being respectively in contact with the fastening surfaces of the first and second flanges.

15. Casing for a compressor of an axial turbine engine, the casing comprising:
- a wall extending annularly around an axis; and
- at least one fastening flange protruding perpendicularly from, and integral with, the wall, the fastening flange comprising:
  - a fastening surface that can be applied against a corresponding mounting surface of the turbine engine, or against another fastening surface;
  - at least one electrical connector with one end having an enlargement lying flush with the fastening surface of said fastening flange.

* * * * *